(No Model.) 2 Sheets—Sheet 1.

J. S. SLATER.
ARMILLARY SPHERE.

No. 482,278. Patented Sept. 6, 1892.

Witnesses.
Inventor.

(No Model.) 2 Sheets—Sheet 2.

J. S. SLATER.
ARMILLARY SPHERE.

No. 482,278. Patented Sept. 6, 1892.

Witnesses
Inventor
John Samuel Slater

UNITED STATES PATENT OFFICE.

JOHN SAMUEL SLATER, OF CALCUTTA, INDIA.

ARMILLARY SPHERE.

SPECIFICATION forming part of Letters Patent No. 482,278, dated September 6, 1892.

Application filed February 12, 1892. Serial No. 421,316. (No model.)

*To all whom it may concern:*

Be it known that I, JOHN SAMUEL SLATER, a subject of the Queen of Great Britain and Ireland, residing at Calcutta, India, have invented an Improved Armillary Sphere, of which the following is a specification.

This invention relates to an improved armillary sphere designed to illustrate the apparent motions of the sun and of the stars in different latitudes, to indicate the times of rising and setting of the sun and of stars whose declination and right ascension are known, to show the apparent position of the ecliptic at any particular time on any day of the year, and for other like studies in connection with the motions of celestial bodies.

Figure 1:
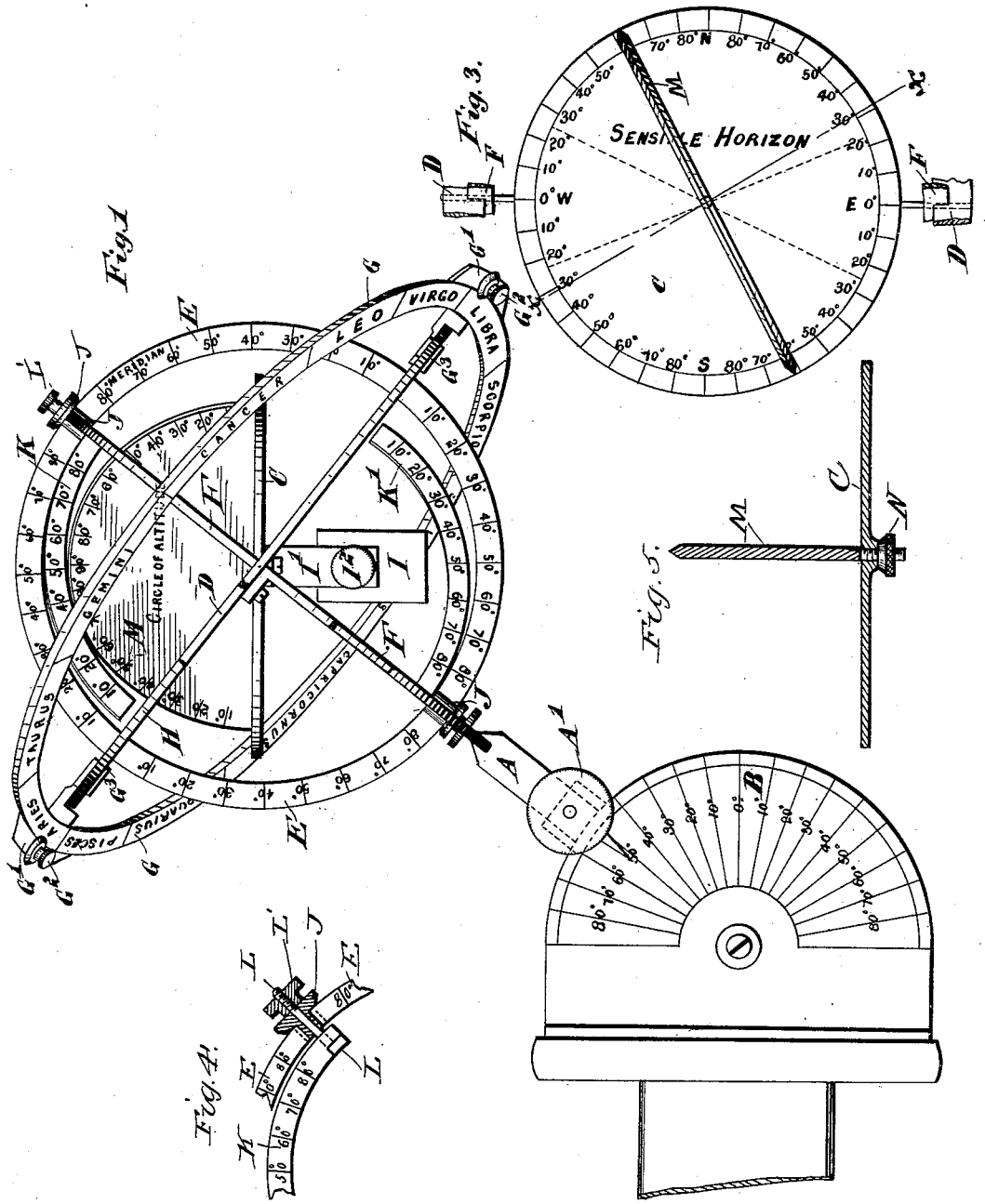
Figure 2:
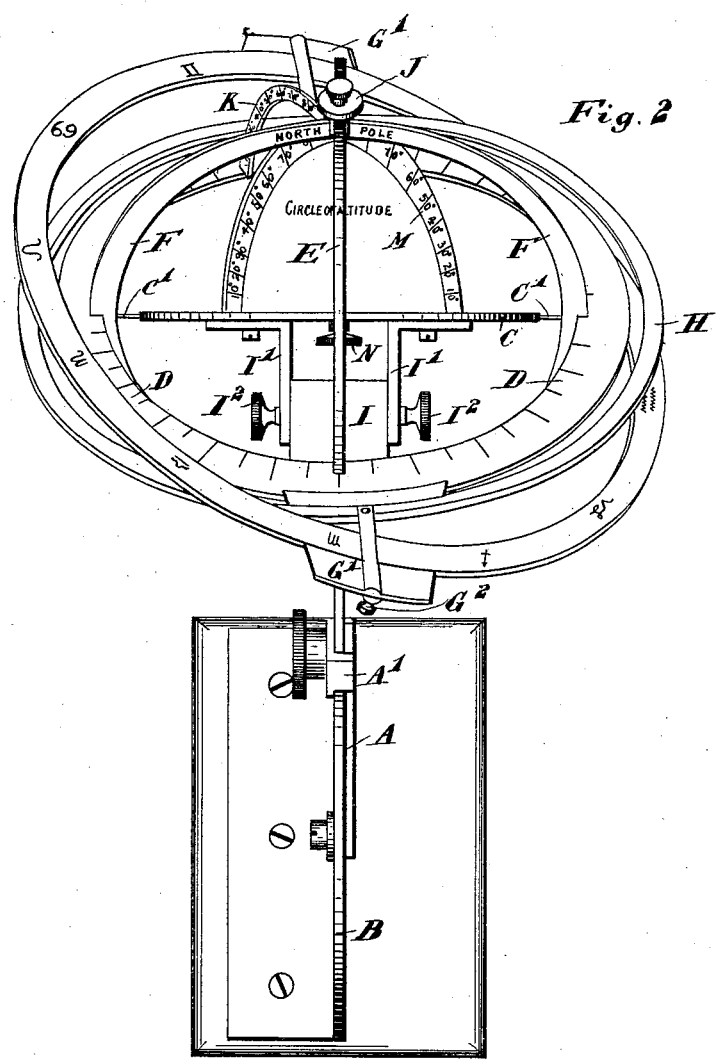

In the accompanying drawings, Figure 1 is a side elevation, Fig. 2 a front elevation, and Fig. 3 a detail, hereinafter referred to, of an armillary sphere constructed according to this invention, showing the parts in position corresponding approximately to latitude fifty-two degrees north. Fig. 4 is a detail view hereinafter referred to. Fig. 5 is a section on the line $x\ x$, Fig. 3.

The annular rings or circles and parts by reference to which the motions of celestial bodies are studied are supported by a pivoted arm A, which moves over a graduated scale B and which can by a suitable clamp A' be fixed at any desired position on the said scale. This scale B is secured to a projecting arm on a suitable stand or support and is graduated from "0" to "90" from a horizontal line passing through the pivot of the arm A, which is marked "zero," these graduations representing north latitude above the said horizontal line and south latitude below the said line. A disk C, representing the sensible horizon, is arranged concentric with the aforesaid annular rings or circles, hereinafter referred to as "circles." This disk C is shown in plan in Fig. 3, this view corresponding with the side elevation thereof shown in Fig. 1. The celestial equator and the meridian are represented by fixed circles D and E, respectively, and another fixed circle F serves as a declination-circle, each of these circles being, as shown, in a plane at right angles to those of the other two.

The ecliptic is represented by a movable circle G, having twelve divisions for the twelve signs of the zodiac and situated in a plane inclined to that of the circle representing the equator at an angle equal to the inclination of the ecliptic to the equator. This circle G is carried by external peripheral supports or clips G', in which it is free to slide, so that it can be rotated about its center in its own plane, clamping-screws $G^2$ being provided for holding it securely in the supports G'. These supports are rigidly connected to a ring H, carried by supports $G^3$, fitting over the edge of the equator-circle and adapted to slide round the same, by which means the ecliptic-circle can be moved around the equator-circle, the ring H serving as a hold for the fingers and obviating the necessity for touching the circle G when it is only desired to move it round the circle D without moving it round its own center.

The disk C, representing the sensible horizon, has the points immediately opposite the meridian-circle marked, respectively, "N" (north) and "S" (south,) while those opposite the declination-circle are marked "E" (east) and "W" (west.) It is preferably graduated from "0" at the east and west to "90" at the north and south points and is mounted between two pivots C', situated, respectively, at the "east" and "west" points. The disk C is also provided with a plumb-weight I to bring it to a horizontal position, this weight being adjustably held between two brackets I' on the lower part of the disk C by means of set-screws $I^2$.

The meridian-circle E is graduated, preferably, from "0" at the point where it meets the celestial equator-circle D to "90" at the points where it meets the declination-circle, being thus divided into four quadrants, as shown.

The equator-circle is divided into twenty-four equal parts representing twenty-four hours, which parts, if desired, may be further subdivided into fractions of an hour, the graduations being, preferably, from the point where the meridian and the equator meet toward "S" on the disk C round the circle toward "W," where the divisions "6" are situated, and so on to the starting-point, which is marked "24."

The declination-circle F and the meridian E are provided at the points where they meet with nut-like pieces J, having transverse slots, into which the said circles enter, the four unremoved portions of the pieces J fitting in the four angles formed by the meeting of the said circles, as shown. The points where the declination-circle and the meridian meet represent, respectively, portions of the North pole and the South pole, being independent of the points marked "north" and "south" on the horizon-disk C, which simply serve to represent the direction of these points to an observer supposed to be standing at the center of the said disk. The radius of motion of the pivoted arm A, carrying the circles and other parts, passes through the North and South poles on the meridian-circle. The declination-circle F need not itself be graduated, the declination being easily read at any point of the equator by means of two segmental quadrants K K', pivoted at one end, one of these—namely, K—being pivoted at the North pole and the other K' being pivoted at the South pole, so that they can be rotated freely on opposite sides of the equator-circle D, to which their free extremities extend. The pivots consist, preferably, each of a long screw L, whose head is cut away on one side, as shown in Fig. 4, and is let into the end of the quadrant, so as to be flush with the inner surface thereof, the cut-away portion fitting against the face of the recess into which the head enters. The stem of this screw passes through the piece J and enters a milled nut L', by which it is held in position. The quadrants K K' are graduated, preferably, from "0" at the equator to "90" at the poles.

To enable altitudes to be read off, the disk C for representing the sensible horizon carries a vertical semicircular plate M, graduated with a protractor-like scale and mounted on the said disk so as to be capable of turning freely about a vertical axis passing through the center of the horizon-disk.

The parts C and M are connected together by a screw-threaded pin that extends from the bottom of the plate, on which projection the scale M is marked at a point midway between the extremities thereof and passes through the center of the disk C, as shown in Fig. 5. This pin is provided beneath the disk with the nut N, by turning which the circle of altitude M can be fixed in any desired position on the disk C or can be released therefrom for adjustment.

To use the instrument, the arm A is adjusted on the scale B to the division corresponding with the degree of latitude with regard to which it is desired to study the motions of the celestial bodies.

To find the declination of the sun or to find the time of sunrise on any day of the year, the ecliptic-circle G is first moved round till the first point in the constellation of Aries, hereinafter referred to as the "first point of Aries," comes opposite the hour-division on the equator which corresponds with the right ascension of the sun on that day as given in astronomical tables or as calculated approximately on the assumption that the right ascension increases at the rate of four minutes for each day after the vernal equinox. The declination of the sun can then be read off by observing the point where the ecliptic-circle G cuts the meridian E, the observation being made from or relatively to the center of the horizon-disk C. The time of sunrise can then be found by moving the declination-quadrant K or K', as the case may be, round toward the point marked "E" on the disk C until the degree thereon corresponding with the declination is level with the said disk. By reading off the division on the equator-circle at which the quadrant has arrived the number of hour-divisions separating this point from the meridian toward "S" can be readily ascertained, and as the sun is on the meridian at noon it follows that it rises that number of hours before noon to which the hour-divisions correspond.

The time of rising and also the path of stars whose declination and right ascension are known may also be found. This is perhaps best illustrated by an example: Thus to find the time of rising of a star whose declination is twenty degrees north and right ascension fourteen hours on the 21st of June for a latitude forty degrees north. On the 21st of June the right ascension of the sun will be about six hours, and as the right ascension of the given star is fourteen hours it will be eight hours behind the sun. Now adjust the declination-quadrant K so as to show the star just on the horizon toward E for, say, forty degrees north latitude. It will be seen that the declination-quadrant in this position cuts the celestial equator at about sixteen and one-half hours. The sun, being eight hours in advance, would be at twenty-four and one-half hours, or half an hour after noon. The star would therefore rise about 12.30 p. m. Similarly by carrying the declination-circle to the west it will be observed that when the star sets the declination-circle points to about seven and one-half hours, and the sun would be eight hours in advance, or fifteen and one-half, which represents 3.30 a. m. If the position of this star at ten o'clock at night on the same day is required, move the declination-circle to two hours on the celestial equator—that is, eight hours behind the sun—which would at that hour be at ten hours after noon. Cause the circle of altitude to revolve until it intersects the twenty-degree graduation on the declination-circle. The intersection shows the altitude at this hour, and the point where the circle of altitude cuts the graduated rim of the horizon-disk shows the angular distance of the star from the west point.

The apparent diurnal motion of the ecliptic can be readily seen if the ecliptic is made to revolve from east to west. At noon at the vernal equinox the first point of Aries is on the meridian, and in this position it will be seen that the ecliptic lies over the horizon from northeast to southwest. At six o'clock in the evening at the vernal equinox the first point of Aries will be at the west point and the ecliptic will cut the meridian twenty-three and one-half degrees north of the celestial equator, and at that hour Cancer will be on the meridian. At midnight the first point of Aries will be at twelve hours on the celestial equator and Libra will be on the meridian, the ecliptic in this position lying over the horizon from southeast to northwest. At six o'clock in the morning the first point of Aries will be in the east and Capricornus will be on the meridian, about twenty-three and one-half degrees south of the celestial equator. To find the position of the ecliptic on any day of the year at any time in any latitude—say, for example, the position for an observer in latitude fifty-two degrees north at ten p. m. on the 7th of August—making the usual calculation for the right ascension of the sun, we find it is about nine hours sixteen minutes. At ten p. m the sun will be at ten hours on the celestial equator and the first point of Aries will be nine hours sixteen minutes in advance—that is, at nineteen hours sixteen minutes. Place the ecliptic so that the first point of Aries is at this hour, and the other signs will then be found to be in place.

There are various other purposes to which this armillary sphere may be put, such as tracing the inclination of the path of the sun on any day with reference to the celestial equator, this inclination being a factor in computing the equation of time. Enough, however, has been explained to enable persons accustomed to astronomical work to make use of the instrument with facility.

What I claim is—

1. An armillary sphere for illustrating motions of celestial bodies, carried by a pivoted arm moving in a vertical plane over a scale graduated to represent latitude, substantially as described.

2. In an armillary sphere for representing motions of celestial bodies, a pivoted weighted disk that represents the sensible horizon and is adapted to remain in a horizontal attitude in all positions of the armillary sphere and an adjustable circle of altitude carried by said weighted disk, substantially as described.

3. An armillary sphere for illustrating motions of celestial bodies, carried by a pivoted arm moving in a vertical plane over a scale graduated to represent latitude and provided with a pivoted weighted disk representing the sensible horizon, the said disk assuming a horizontal position in all positions of the armillary sphere, substantially as described.

4. An armillary sphere carried by a pivoted arm moving over a scale representing latitude and provided with a weighted horizon-disk and with movable declination-quadrants pivoted at the poles, substantially as described.

5. In an armillary sphere carried by a pivoted arm moving over a scale representing latitude, a circle representing the ecliptic arranged to be turned about its own center and also around the equator-circle and means for supporting the same, substantially as described.

6. In an armillary sphere carried by a pivoted arm moving over a scale representing latitude, the combination of circles representing, respectively, the equator, the meridian, and the ecliptic, a weighted horizon-disk, and movable declination-quadrants pivoted at the poles, substantially as described.

7. In an armillary sphere, the combination, with circles D, E, F, and G, disk C, weight I, scale M, and quadrants K K', of the arm A, moving over scale B and having a clamp A' for fixing it in any desired position on said scale, substantially as described.

In testimony whereof I have signed my name to this specification in the presence of two subscribing witnesses.

JOHN SAMUEL SLATER.

Witnesses:
  E. F. BURTON,
  CHARLES F. MONCKTON,
       *Solrs., Calcutta.*